(12) United States Patent
Arakawa et al.

(10) Patent No.: US 10,204,744 B2
(45) Date of Patent: Feb. 12, 2019

(54) CAPACITOR

(71) Applicant: Murata Manufacturing Co., Ltd., Nagaokakyo-shi, Kyoto-fu (JP)

(72) Inventors: Takeo Arakawa, Nagaokakyo (JP); Hiromasa Saeki, Nagaokakyo (JP); Noriyuki Inoue, Nagaokakyo (JP); Naoki Iwaji, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 1 day.

(21) Appl. No.: 15/363,336

(22) Filed: Nov. 29, 2016

(65) Prior Publication Data

US 2017/0076872 A1 Mar. 16, 2017

Related U.S. Application Data

(63) Continuation of application No. PCT/JP2015/064953, filed on May 25, 2015.

(30) Foreign Application Priority Data

Jun. 11, 2014 (JP) ................................ 2014-120482

(51) Int. Cl.
| | | |
|---|---|---|
| H01G 9/045 | (2006.01) | |
| H01G 4/33 | (2006.01) | |
| H01G 9/00 | (2006.01) | |
| H01G 9/04 | (2006.01) | |
| H01G 9/048 | (2006.01) | |
| H01G 9/055 | (2006.01) | |
| H01G 9/07 | (2006.01) | |
| H01G 9/15 | (2006.01) | |

(52) U.S. Cl.
CPC ........... *H01G 9/045* (2013.01); *H01G 9/0032* (2013.01); *H01G 9/0036* (2013.01); *H01G 9/048* (2013.01); *H01G 9/055* (2013.01); *H01G 9/07* (2013.01); *H01G 9/15* (2013.01)

(58) Field of Classification Search
CPC ........ H01G 9/045; H01G 4/33; H01G 9/0032; H01G 9/0036; H01G 9/04; H01G 9/048; H01G 9/15
USPC ........................................................ 361/528
See application file for complete search history.

(56) References Cited

U.S. PATENT DOCUMENTS

| | | | |
|---|---|---|---|
| 2,305,580 A * | 12/1942 | Clark ....................... | H01B 3/10 361/305 |
| 8,451,582 B2 | 5/2013 | Sneh et al. | |
| 2007/0183120 A1* | 8/2007 | Fujimoto ............. | H01G 9/0032 361/528 |

(Continued)

FOREIGN PATENT DOCUMENTS

| | | |
|---|---|---|
| JP | 2004-356360 A | 12/2004 |
| JP | 2008-507847 A | 3/2008 |

OTHER PUBLICATIONS

International Search Report issued for PCT/JP2015/064953, dated Aug. 4, 2015.

(Continued)

*Primary Examiner* — Michael P McFadden
(74) *Attorney, Agent, or Firm* — Arent Fox LLP

(57) ABSTRACT

A capacitor that includes a porous metallic base material; a phosphorus-containing layer on the porous metallic base material; a dielectric layer on the phosphorus-containing layer; and an electrode on the dielectric layer.

18 Claims, 4 Drawing Sheets

(56) References Cited

U.S. PATENT DOCUMENTS

2008/0094775 A1 4/2008 Sneh et al.
2011/0310526 A1 12/2011 Sneh et al.
2013/0314845 A1* 11/2013 Chacko .................. H01G 9/04
361/502

OTHER PUBLICATIONS

Written Opinion of the International Searching Authority issued for PCT/JP2015/064593, dated Aug. 4, 2015.

* cited by examiner

FIG. 1
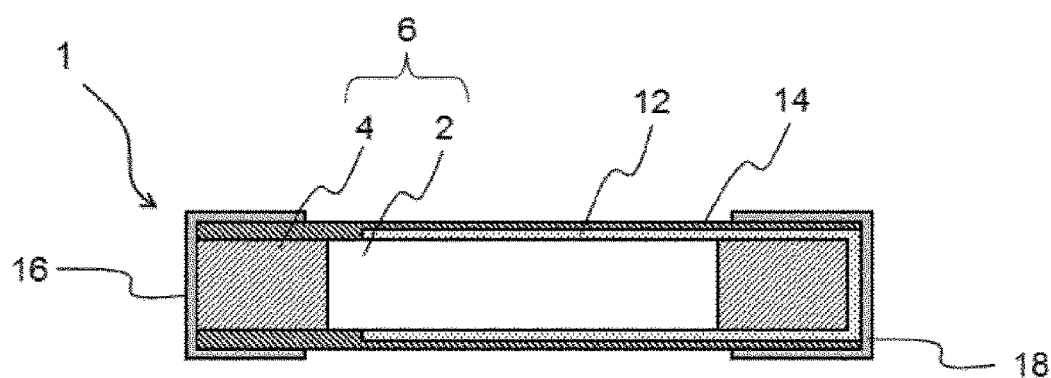
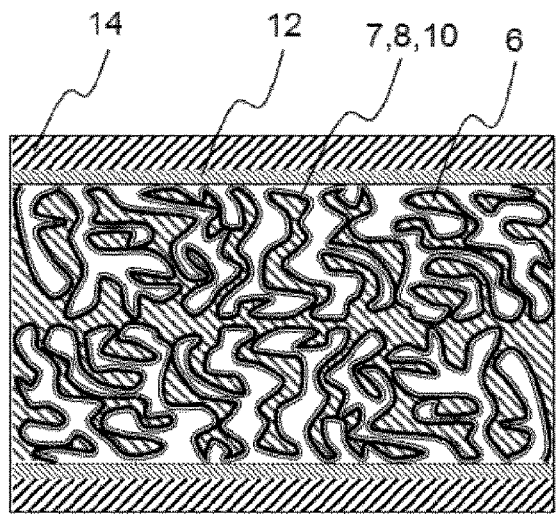
FIG. 2(a)
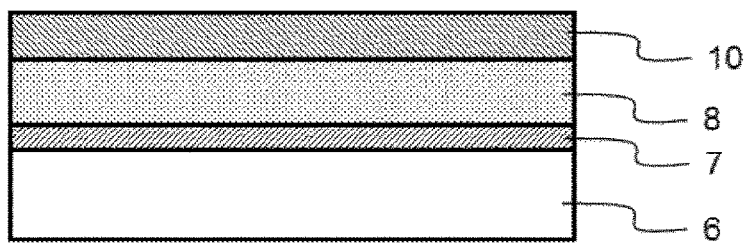
FIG. 2(b)

CAPACITOR

CROSS REFERENCE TO RELATED APPLICATIONS

The present application is a continuation of International application No. PCT/JP2015/064953, filed May 25, 2015, which claims priority to Japanese Patent Application No. 2014-120482, filed Jun. 11, 2014, the entire contents of each of which are incorporated herein by reference.

FIELD OF THE INVENTION

The present invention relates to a capacitor and a manufacturing method therefor.

BACKGROUND OF THE INVENTION

In recent years, with higher-density mounting of electronic devices, capacitors with higher electrostatic capacitance have been required. As such a capacitor, for example, Patent Document 1 discloses a capacitor including a conformal and uniform dielectric layer on a metallic foil etched and a conformal and uniform conductive layer on the dielectric layer.

Patent Document 1: Japanese Patent Application Laid-Open (Translation of PCT Application) No. 2008-507847

SUMMARY OF THE INVENTION

Aluminum electrolytic capacitors are manufactured by forming, on base materials, dielectric films that provide electrostatic capacitance as capacitors. While porous metallic base materials may be used as the base materials in order to achieve high electrostatic capacitance, various impurities derived from methods for manufacturing the porous metallic base materials are present on the surfaces of the porous metallic base materials, and the porous metallic base materials have no clean surfaces, unlike planar substrates such as Si substrates. In addition, even in trying to clean the impurities, it is extremely difficult to remove the impurities adequately because the surfaces of the porous metallic base materials are not smooth and are intricately shaped.

The inventors have found that while there is a need to cover the surface of a porous metallic base material with a dielectric layer in the preparation of a capacitor, the presence of impurities, if any, on the surface of the base material has the possibility of causing problems such as an increase in leakage current, thereby failing to adequately function as a capacitor.

In the case of coating the surface of the metallic base material directly with the dielectric layer like the above-mentioned capacitor described in Patent Document 1, there is a possibility of decreasing the performance and reliability of the capacitor under the influence of such impurities, which can cause an increase in leakage current. In particular, in the case of using a porous metallic base material, this influence is significant.

An object of the present invention is to provide a capacitor which is less likely to be affected by impurities on the surface of a porous metallic base material, is low in leakage current, and high in reliability.

The inventors have found, as a result of making earnest studies in order to solve the problem mentioned above, that treating the surface of a porous metallic base material with a phosphoric acid-based solution before forming a dielectric layer on the porous metallic base material, and then forming the dielectric layer can reduce the influence of impurities present on the surface of the porous metallic base material, and provide a capacitor which has excellent characteristics.

According to a first aspect of the present invention, a capacitor is provided which includes a porous metallic base material; a layer including phosphorus atoms, formed on the porous metallic base material; a dielectric layer formed on the layer including phosphorus atoms; and an upper electrode formed on the dielectric layer.

According to a second aspect of the present invention, a method for manufacturing a capacitor is provided. The method includes the steps of treating the surface of a porous metallic base material with a phosphoric acid-based solution to form a layer including phosphorus atoms on the surface of the porous metallic base material; forming a dielectric layer by a gas-phase method on the layer including phosphorus atoms; and forming an upper electrode on the dielectric layer.

According to the present invention, a capacitor which is less likely to be affected by impurities on the surface of a porous metallic base material, low in leakage current, and high in reliability is provided by treating the surface of the porous metallic base material with a phosphoric acid-based solution.

BRIEF EXPLANATION OF THE DRAWINGS

FIG. 1 is a schematic cross-sectional view of a capacitor according to an embodiment of the present invention.

FIG. 2(a) is an enlarged view of a high-porosity part in the capacitor in FIG. 1, and FIG. 2(b) is a diagram schematically illustrating a layered structure in the high-porosity part.

FIGS. 3-2(e) to 3-2(h) are diagrams, following FIGS. 3-1(a) to 3-1(d), illustrating a manufacturing process for the capacitor in FIG. 1.

FIGS. 3-3(i) to 3-3(k) are diagrams, following FIGS. 3-2(e) to 3-2(h), illustrating a manufacturing process for the capacitor in FIG. 1.

DETAILED DESCRIPTION OF THE INVENTION

A capacitor according to the present invention will be described in detail below with reference to the drawings. However, the capacitor according to the present embodiment and the shapes and arrangement of respective constructional elements are not limited to the examples shown in the figures.

Figures 1A, 3:
FIGS. 3-1(a) to 3-1(d) are diagrams illustrating a manufacturing process for the capacitor in FIG. 1.
Figures 1B, 3:
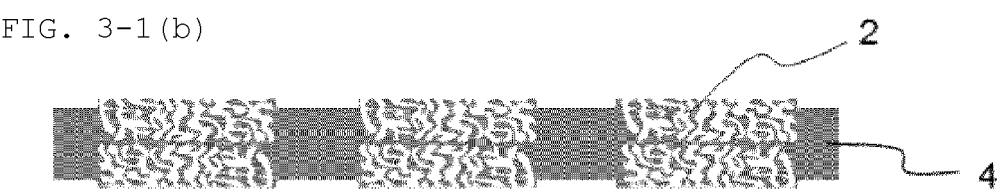
Figures 1C, 3:
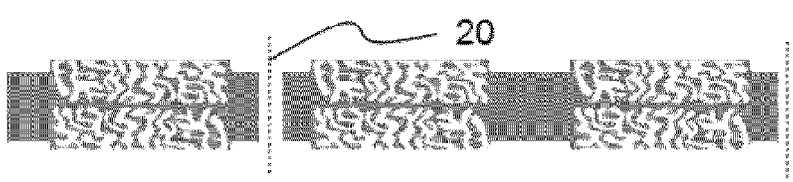
Figures 1D, 3:
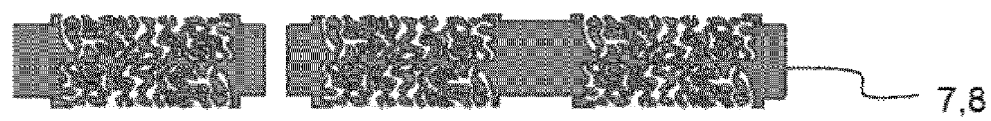
Figures 2E, 3:
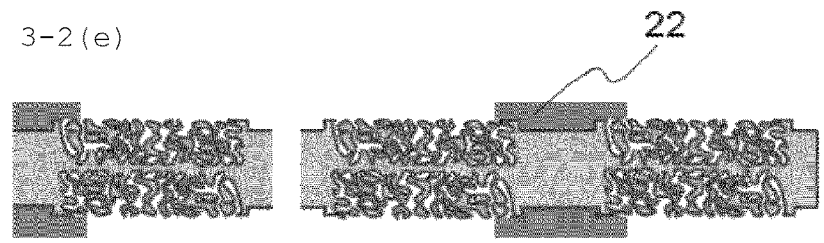
Figures 2F, 3:
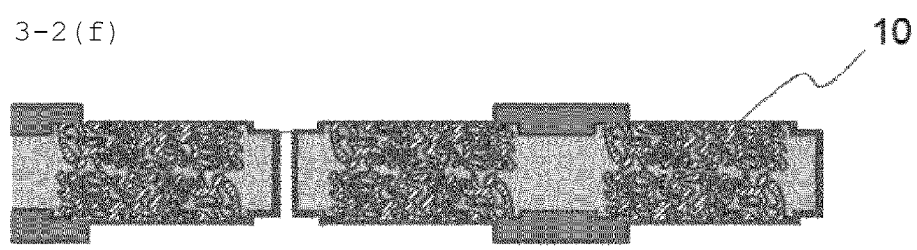
Figures 2G, 3:
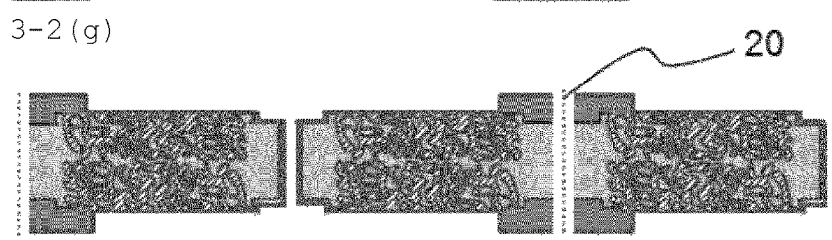
Figures 2H, 3:

FIG. 1 shows a schematic cross-sectional view of a capacitor 1 according to the present embodiment (however, a phosphorus atom-containing layer 7, a dielectric layer 8, and an upper electrode 10 are not shown for the sake of simplification), FIG. 2(a) shows an enlarged view of a high-porosity part in the capacitor 1, and FIG. 2(b) schematically illustrates the layered structure (that is, the layered structure of a porous metallic base material 6, the phosphorus atom-containing layer (hereinafter, also referred to simply as a "phosphorus-containing layer") 7, the dielectric layer 8, and the upper electrode 10) of the high-porosity part. As shown in FIG. 1 and FIGS. 2(a) and 2(b), the capacitor 1 according to the present embodiment has a substantially cuboid shape, and schematically has the porous metallic base material 6 including a high-porosity part 2 in the central part and low-porosity parts 4 at side-surface parts, the phosphorus-containing layer 7 formed thereon, the dielectric layer 8 formed on the phosphorus-containing layer 7, the upper electrode 10 formed on the dielectric layer 8, a wiring electrode 12 formed thereon to be electrically connected to the upper electrode 10, and a protective layer 14 further formed thereon. On side surfaces of the porous metallic base material 6, a first terminal electrode 16 and a second terminal electrode 18 are provided to be opposed, and the first terminal electrode 16 is electrically connected to the porous metallic base material 6, whereas the second terminal electrode 18 is electrically connected to the upper electrode 10 with the wiring electrode 12 interposed therebetween.

The term "porosity" of the porous metallic base material in this specification refers to the proportion of voids in the porous metallic base material. The porosity can be measured in the following way.

First, a porous metallic base material is processed, by focused ion beam (FIB: Focused Ion Beam) processing, into a thin section of 60 nm or less in thickness. A predetermined region (5 μm×5 μm) of the thin section sample is imaged with the use of a transmission electron microscope (TEM: Transmission Electron Microscope). The obtained image is subjected to an image analysis, thereby figuring out the area of the porous metallic base material in which the metal is present. Then, the porosity can be calculated from the following equality.

Porosity=(Measured Area−Area of Base Material in which Metal is Present)/Measured Area In this specification, the term "high-porosity part" of the porous metallic base material means a region where the porosity is 25% or more. It is to be noted that the high-porosity part of the porous metallic base material is related to the porosity of the porous metallic base material itself. More specifically, voids of the porous metallic base material can be eventually filled with the upper electrode, a polymer, or the like in the process of preparing the capacitor, and the "porosity" mentioned above is calculated with the thus filled voids also regarded as voids. The same applies to the "low-porosity parts" of the porous metallic base material.

In this specification, the term "low-porosity part" of the porous metallic base material means a site that is lower in porosity as compared with the high-porosity part, specifically, a region that is 70% or less in porosity in comparison with the high-porosity part.

In this specification, the term "side surface" of the porous metallic base material means a surface substantially perpendicular to the mounting surface of a capacitor. It is to be noted that the lower surface is regarded as the mounting surface of the capacitor in FIGS. 1 to 3-3(k).

The metal constituting the porous metallic base material is not particularly limited as long as the metal is conductive, but examples thereof include, for example, metals such as aluminum, tantalum, nickel, copper, titanium, niobium, and iron, and alloys such as stainless steel and duralumin, and it is aluminum that is preferred.

Preferred porous metallic base materials include aluminum etching foil, sintered bodies of tantalum powders, sintered bodies of nickel powders, and porous metals synthesized by dealloying methods, and it is aluminum etching foil that is particularly preferred.

The porous metallic base material can be prepared by a method well known in the art, such as etching, sintering, or a dealloying method. Alternatively, a commercially available porous metallic base material may be used for the porous metallic base material. Further, the porous metallic base material may have a natural oxide film or a natural hydroxide film of 10 nm or less.

The thickness of the porous metallic base material is not particularly limited, but can be appropriately selected for any purpose, and may be for example, 10 to 1000 μm, preferably 30 to 300 μm. It is to be noted that the thickness of the porous metallic base material means a length in a direction perpendicular to the mounting surface of the capacitor.

As illustrated in FIG. 1, the porous metallic base material 6 has, at a pair of opposed side-surface parts thereof, low-porosity parts 4, and has a high-porosity part 2 therebetween.

The porosity of the high-porosity part of the porous metallic base material is preferably 30% or more, more preferably 35% or more, from the perspective of increasing the surface area to further increase the capacitance of the capacitor. In addition, from the perspective of ensuring the mechanical strength, the porosity is preferably 80% or less, and more preferably 65% or less.

The high-porosity part of the porous metallic base material is not particularly limited, but preferably has an expanded surface ratio of 30 to 10,000 times, more preferably 50 to 5,000 times, for example, 300 to 600 times. In this regard, the expanded surface ratio refers to the ratio of the surface area of the porous metal to the projected area thereof.

The low-porosity parts of the porous metallic base material contribute to enhanced mechanical strength of the capacitor. The porosity of each of the low-porosity parts is preferably 60% or less of the porosity of the high-porosity part, and more preferably 50% or less of the porosity of the high-porosity part, from the perspective of increasing the mechanical strength. For example, the porosity of each of the low-porosity parts is preferably 20% or less, and more preferably 10% or less. In addition, the low-porosity part each may have a porosity of 0%.

The low-porosity parts are 3 μm to 1 mm, preferably 10 to 500 μm in width (the length from the side surface in common with the side surface of the porous metallic base material to the surface opposed to the side surface; the length in the horizontal direction of the paper in FIGS. 1 to 3). The mechanical strength of the capacitor can be enhanced by adjusting the low-porosity parts to 3 μm or more, preferably 10 μm or more in width. In addition, the adjustment of the low-porosity parts to 1 mm or less in width makes it possible to ensure a larger high-porosity part in a porous metallic member in the same volume, thereby making it possible to achieve high electrostatic capacitance. The thickness (the length in a direction perpendicular to the mounting surface of the capacitor) of the low-porosity part is preferably 50% or more of the thickness of the porous metallic base material, and preferably equal to that of the porous metallic base material (that is, the whole thickness of the porous metallic base material), in order to enhance the mechanical strength of the capacitor.

The method for forming the low-porosity parts is not particularly limited as long as a desired porosity can be achieved, but the parts are preferably formed by pressing with a mold or the like, for example. The pressing may be carried out to sandwich the porous metallic base material from the upper and lower surfaces of thereof, or carried out from only one of the surfaces.

In addition, as an alternative method, the low-porosity parts may be formed in a way that pores are filled by irradiating the porous metallic base material made porous in advance, with a $CO_2$ laser, a YAG laser, or an excimer laser, as well as an all-solid-state pulsed layer such as a femtosecond laser, a picosecond laser, and a nanosecond laser. The all-solid-state pulsed lasers such as a femtosecond laser, a picosecond laser, and a nanosecond laser are preferred because the shape and porosity of the low-porosity parts can be controlled with more precision.

The low-porosity parts may be formed by filling pores in the high-porosity part as mentioned above, but can be also formed in the process of forming pores in a metallic base material that is not made porous. For example, in the case of preparing porous metallic foil by etching, sites at which low-porosity parts are to be formed are subjected to masking, and then to etching, thereby causing the masked sites to serve as non-etched layers, and thus forming low-porosity parts. In addition, in the case of forming a low-porosity part in the central part of foil, the etching treatment is stopped before pores are formed into the central part of the foil, thereby causing the central part to serve as a non-etched layer, and thus forming a low-porosity part.

Low-porosity parts in various shapes can be formed by combining the pressing, laser processing, and non-etched layer formation mentioned above.

It is to be noted that while the capacitor 1 according to the present embodiment has the low-porosity parts at both of the side-surface parts, the low-porosity parts are not essential elements although it is preferable to locate the low-porosity parts in order to enhance the strength. In addition, even in the case of locating low-porosity parts, the number and locations thereof are not particularly limited.

In the capacitor 1, the phosphorus atom-containing layer 7 is formed on the porous metallic base material 6.

The method for forming the phosphorus atom-containing layer is not particularly limited, but for example, when the porous metallic base material is composed of aluminum, the layer can be preferably formed by treating the surface of the porous metallic base material with a phosphoric acid-based solution.

The phosphoric acid-based solution is not particularly limited as long as the phosphorus atom-containing layer can be formed on the surface of the porous metallic base material. Preferably, the phosphoric acid-based solution is a solution, preferably an aqueous solution of a phosphoric acid and/or a phosphate. Polar protic solvents other than water may be used, such as ethanol and isopropyl alcohol. In addition, an organic solvent may be mixed with a polar protic solvent.

The phosphate is not particularly limited, but examples thereof include salts of phosphoric acids with ammonia, iron, zinc, manganese, calcium, sodium, nickel, cobalt, and the like. The phosphate may be a normal salt, or a hydrogen salt. These salts may be used singly, or two or more thereof may be used.

As preferred phosphoric acid-based solutions, phosphoric acid aqueous solutions and aqueous solutions of ammonia phosphates are preferred, and an aqueous solution of ammonium dihydrogen phosphate is particularly preferred. These aqueous solutions are advantageous in that the solutions are close to neutrality, and less likely to erode the aluminum constituting the base material. In addition, the solutions are also advantageous in pH buffering action.

When the phosphoric acid-based solution is an aqueous solution, the pH thereof is preferably 1 to 10, more preferably 4 to 7 at which aluminum is not excessively dissolved.

The phosphoric acid-based solution may contain other components, such as, for example, a pH adjuster and a surface modifier such as a surfactant, a viscosity adjuster, and a filler.

The method for the phosphoric acid treatment mentioned above is not particularly limited, but examples of the method include immersion, spraying, and coating, and preferably, the porous metallic base material is immersed in the phosphoric acid-based solution.

The treatment conditions can be selected appropriately depending on the material for the porous metallic base material, the type of the phosphoric acid-based solution used, and the like, and may be, for example, immersion for 1 minute to 1 hour at a temperature of normal temperature (for example, 25° C.) to 98° C., although not limited thereto.

After the immersion mentioned above, post-treatment such as annealing treatment may be carried out, if desired. Carrying out the post-treatment such as annealing treatment can promote the removal of hydroxyl groups at the phosphorus-containing layer and crystallization to increase the density, and form a uniform and strong phosphorus-containing layer. Although not limited, it is preferable to carry out, for example, annealing for 1 minute to 24 hours at a temperature of 100 to 550° C.

The phosphorus atom-containing layer is derived from a reaction between the material for the porous metallic base material and a substance in the phosphoric acid-based solution, for example, phosphate ions. For example, when the porous metallic base material of aluminum is treated with a phosphoric acid aqueous solution, the phosphorus atom-containing layer can be formed from an aluminum phosphate $(Al(PO_x)_y$, (x and y represent any value, and x is preferably 4, whereas y is preferably 1)). More specifically, the phosphoric acid treatment may be understood as a surface modification to the porous metallic base material. Further, the aluminum phosphate may partially contain hydroxyl groups even after annealing, and form a hydrate without any problem.

The thickness of the phosphorus atom-containing layer is not particularly limited, but for example, preferably 20 nm or less, more preferably 0.5 to 10 nm. The adjustment of the phosphorus atom-containing layer to 0.5 nm or more in thickness can further reduce the influence of impurities on the material surface of the porous metallic base material. In addition, the adjustment of the phosphorus atom-containing layer to 10 nm or less in thickness makes it possible to reduce the influence of a decrease in the electrostatic capacitance density of the capacitor due to the phosphorus atom-containing layer. It is to be noted that the thickness of the phosphorus atom-containing layer can be measured by observing a cross section with the use of energy dispersive X-ray analysis.

In the capacitor 1, the dielectric layer 8 is formed on the phosphorus-containing layer 7.

The material that forms the dielectric layer is not particularly limited as long as the material has an insulating property, but preferably, examples thereof include metal oxides such as $AlO_x$ (for example, $Al_2O_3$), $SiO_x$ (for example, $SiO_2$), $AlTiO_x$, $SiTiO_x$, $HfO_x$, $TaO_x$, $ZrO_x$, $HfSiO_x$, $ZrSiO_x$, $TiZrO_x$, $TiZrWO_x$, $TiO_x$, $SrTiO_x$, $PbTiO_x$, $BaTiO_x$, $BaSrTiO_x$, $BaCaTiO_x$, and $SiAlO_x$; metal nitrides such as $AlN_x$, $SiN_x$, and $AlScN_x$; and metal oxynitrides such as $AlO_xN_y$, $SiO_xN_y$, $HfSiO_xN_y$, and $SiC_xO_yN_z$, and $AlO_x$, $SiO_x$, $SiO_xN_y$, and $HfSiO_x$ are preferred. It is to be noted that the formulas mentioned above are merely intended to represent the constitutions of the materials, and not intended to limit the compositions. More specifically, the x, y, and z attached to O and N may have any value, and the respective elements including the metal elements may have any existence ratio.

The thickness of the dielectric layer is not particularly limited, but for example, preferably 5 to 100 nm, and more preferably 10 to 50 nm. The adjustment of the thickness of the dielectric layer to 5 nm or more can enhance the insulating property, thereby making it possible to reduce the leakage current. In addition, the adjustment of the thickness of the dielectric layer to 100 nm or less makes it possible to achieve higher electrostatic capacitance.

The dielectric layer is preferably formed by a gas phase method, for example, a vacuum deposition method, a chemical vapor deposition (CVD: Chemical Vapor Deposition) method, a sputtering method, an atomic layer deposition (ALD: Atomic Layer Deposition) method, a pulsed laser deposition method (PLD: Pulsed Laser Deposition), or the like. The ALD method is more preferred because a more homogeneous and denser film can be formed even in fine pores of the porous metallic member.

In the capacitor 1, the upper electrode 10 is formed on the dielectric layer 8.

The material constituting the upper electrode is not particularly limited as long as the material is conductive, but examples thereof include, Ni, Cu, Al, W, Ti, Ag, Au, Pt, Zn, Sn, Pb, Fe, Cr, Mo, Ru, Pd, and Ta and alloys thereof, e.g., CuNi, AuNi, AuSn, and metal oxides and metal oxynitrides such as TiN, TiAlN, TiON, TiAlON, TaN, conductive polymers (for example, PEDOT(poly(3,4-ethylenedioxythiophene)), polypyrrole, polyaniline), and TiN and TiON are preferred.

The thickness of the upper electrode is not particularly limited, but for example, preferably 3 nm or more, and more preferably 10 nm or more. The adjustment of the thickness of the upper electrode to 3 nm or more can reduce the resistance of the upper electrode itself.

The upper electrode may be formed by an ALD method. The use of the ALD method can increase the capacitance of the capacitor. The upper electrode may be formed by, as an alternative method, a method such as a chemical vapor deposition (CVD: Chemical Vapor Deposition) method, plating, a bias sputtering, Sol-Gel, and conductive polymer filling which can coat the dielectric layer and substantially fill pores of the porous metallic base material. Preferably, the upper electrode may be formed in a way that a conductive film is formed by an ALD method on the dielectric layer, and thereon, pores are filled by another approach with a conductive substance, preferably a substance that is lower in electrical resistance. This configuration can achieve a higher capacitance density and a lower equivalent series resistance (ESR: Equivalent Series Resistance) in an effective manner.

It is to be noted that when the upper electrode has insufficient conductivity as a capacitor electrode after the formation of the upper electrode, an extended electrode layer composed of Al, Cu, Ni, or the like may be additionally formed on the surface of the upper electrode by a method such as sputtering, vapor deposition, or plating.

In the capacitor 1, the wiring electrode 12 is formed on the upper electrode 10.

The material constituting the wiring electrode is not particularly limited, but examples thereof include, for example, metals such as Al, Cu, Ni, Sn, Ag, and Au, and alloys and intermetallic compounds. The method for forming the wiring electrode is not particularly limited, but for example, a CVD method, plating, sputtering, baking of a conductive paste, and the like can be used.

In the capacitor 1, the porous metallic base material with the phosphorus-containing layer 7, dielectric layer 8, upper electrode 10, and wiring electrode 12 formed is protected by the protective layer 14.

Preferably, the protective layer 14 is formed to cover the entire porous metallic base material, excluding connections to the terminal electrodes. The protective layer can further enhance the moisture resistance, insulating performance, and mechanical strength of the capacitor.

The material constituting the protective layer is not particularly limited as long as the material has an insulating property, but for example, the same material as the material forming the dielectric layer mentioned above, preferably $SiN_x$, $SiO_x$, $AlTiO_x$, or $AlO_x$, more preferably $SiO_x$, or a resin coating such as polyepoxy or polyimide or a glass coating can be used.

The thickness of the protective layer is not particularly limited, as long as the thickness can achieve a desired function, for example, moisture resistance or insulating performance, but for example, 0.5 μm to 50 μm, preferably 1 μm to 20 μm.

The method for forming the protective layer is not particularly limited, but can be selected appropriately depending on the material, such as, for example, a CVD method, plating, sputtering, spraying, screen printing, dispensing, and laminating resin films.

The capacitor 1 has, at side surfaces thereof, a pair of the first terminal electrode 16 and the second terminal electrode 18 opposed.

The first terminal electrode 16 is electrically connected to the porous metallic base material 6, whereas the second terminal electrode 18 is electrically connected to the upper electrode 10, and the first terminal electrode and the second terminal electrode are located to be electrically insulated in the capacitor.

The materials constituting the first terminal electrode and the second terminal electrode (hereinafter, also referred to collectively "terminal electrodes") are not particularly limited as long as the materials are conductive, but for example, metals such as Cu, Ni, Sn, Au, Ag, and Pb, and alloys thereof can be used.

The terminal electrodes are not particularly limited in terms of thickness, but may be 1 to 50 μm, preferably 1 to 20 μm in thickness.

The method for forming the terminal electrodes is not particularly limited, but may be formed, for example, by plating, or formed by applying and baking a conductive paste.

This capacitor can prevent the diffusion of impurities on the porous metallic base material to the dielectric layer and interdiffusion between the porous metallic base material and the dielectric layer, and reduce the thickness of a dead layer, because the capacitor has the phosphorus atom-containing layer between the porous metallic base material and the dielectric layer. As mentioned above, the capacitor according to the present invention can prevent the diffusion of impurities on the porous metallic base material, thus making it possible to use, as capacitor applications, even porous metallic base materials with high impurity concentrations, which are normally not suitable for capacitor applications.

It is to be noted that it is possible to make various modifications to the capacitor according to the present invention, and for example, a layer for enhancing the adhesion between the respective layers, a buffer layer for preventing the diffusion of constituents between the respective layers, or the like may be provided between the respective layers.

The capacitor according to the present invention can be manufactured by a method including the steps of treating the surface of a porous metallic base material with a phosphoric acid-based solution to form a phosphorus atom-containing layer on the surface of the porous metallic base material; forming a dielectric layer by a gas-phase method on the phosphorus atom-containing layer; and forming an upper electrode on the dielectric layer.

A process for manufacturing the capacitor 1 according to the present embodiment as described above will be specifically described below. It is to be noted that FIGS. 3-1, 3-2, and 3-3 are referred to collectively as FIG. 3.

As shown in FIG. 3(*a*), first, the porous metallic base material 6 is prepared. As mentioned above, the porous metallic base material can be prepared by a method well known in the art, such as etching, sintering, or a dealloying method. Alternatively, a commercially available porous metallic base material may be used for the porous metallic base material.

Next, as shown in FIG. 3(*b*), the low-porosity parts 4 are formed in the porous metallic base material 6. In one porous metal base material, multiple low-porosity parts are formed at intervals depending on the size of a desired capacitor. More specifically, multiple elements are formed from the porous metallic base material. The low-porosity parts can be formed by, as mentioned above, for example, pressing with a mold, or by a $CO_2$ laser, a YAG laser, and an excimer laser, and an all-solid-state pulsed laser such as a femtosecond laser, a picosecond laser, and a nanosecond laser.

Next, as shown in FIG. 3(*c*), the porous metallic base material is cut along dashed lines 20 in the low-porosity parts (preferably, substantially in the central parts). However, at this point, the porous metallic base material is not completely cut into element units, with one of side surfaces kept coupled to the adjacent element.

The method for cutting the porous metallic base material is not particularly limited, but the material can be cut by, for example, one of cutting by laser, punching through a mold, and cutting with a dicer, a carbide blade, a slitter, or a pinnacle blade, or combinations thereof.

The manufacture of a capacitor according to the present invention includes the step of cutting the porous metallic base material as mentioned above. In general, the presence of a porous site causes, in this cutting, the generation of shear drop such as burr and/or drawing and deformation in the direction of cutting the cutting surface. However, the method for manufacturing a capacitor according to the present invention makes it possible to suppress the generation of such burr, because the cut sections are located in the low-porosity parts.

Next, as shown in FIG. 3(*d*), the surface of the porous metallic base material 6 (the entire exposed surface of the porous metallic base material in the example shown) is subjected to phosphoric acid treatment by immersion in a phosphoric acid-based solution, thereby forming the phosphorus-containing layer 7, and then, on the phosphorus-containing layer 7, the dielectric layer 8 is formed by a gas-phase method, preferably an ALD method. It is to be noted that while the phosphorus-containing layer 7 and the dielectric layer 8 are shown as if as one layer in FIG. 3 for the sake of simplicity, a layered structure is actually included where the dielectric layer 8 is formed on the phosphorus-containing layer 7.

Next, as shown in FIG. 3(*e*), a mask 22 is formed partially on the porous metallic base material with dielectric layer 8 formed, specifically on a site where the first terminal electrode 16 is to be formed later.

The material constituting the mask is not particularly limited, but examples thereof include epoxy resins, polyimide resins, and silicone resins.

The method for forming the mask is not particularly limited, but examples thereof include screen printing, dispensing, dipping, ink-jet methods, and spraying.

Next, as shown in FIG. 3(*f*), an upper electrode 10 is formed on the dielectric layer 8. In the example shown, as exemplified in FIG. 2(*b*), a conductive substance layer to serve as the upper electrode is formed to cover the entire element, and the upper electrode also serves as a wiring electrode 12.

The upper electrode can be formed by a method such as an ALD method, a CVD method, plating, bias sputtering, Sol-Gel, or conductive polymer filling. In addition, these methods can be used in combination. For example, the upper electrode may be formed in a way that a conductive film is formed by an ALD method on the dielectric layer, and thereon, pores are filled by another method.

Next, as shown in FIG. 3(*g*), the porous metallic base material is cut in the low-porosity parts with the mask formed (preferably in the central part), and thus divided into respective element units. For a method for the cutting, the same method as for the cutting in FIG. 3(*c*) as mentioned above can be used.

Next, as shown in FIG. 3(*h*), the mask is removed. The mask can be removed by an appropriate method depending on the material constituting the mask, and the like, for example, by cleaning or heat treatment.

Next, as shown in FIG. 3(*i*), a protective layer 14 is formed to cover the entire element. As mentioned above, the protective layer can be formed by, for example, a CVD method, plating, sputtering, spraying, printing, or the like.

Next, as shown in FIG. 3(*j*), portions of the protective layer, specifically, sites where terminal electrodes are to be formed are etched to expose the porous metallic base material 6 (the left side surface in the figure) and the upper electrode 10 (the right side surface in the figure).

Finally, as shown in FIG. 3(*k*), a first terminal electrode 16 and a second terminal electrode 18 are formed. The first terminal electrode 16 is formed to be electrically connected to the porous metallic base material 6 and electrically isolated from the upper electrode 10. The second terminal electrode 18 is formed to be electrically connected to the upper electrode 10 and electrically isolated from the porous metallic base material 6. The terminal electrodes may be formed by plating as mentioned above, or formed by applying a conductive paste, and then baking or curing the paste.

While the capacitor and manufacturing method therefor according to the present invention have been described above with reference to the capacitor 1 according to the embodiment as mentioned above, the present invention is not limited thereto, and various modifications can be made thereto.

EXAMPLE

Example 1

Prepared as a porous metallic base material was commercially available aluminum etching foil for aluminum electrolytic capacitor with a thickness of 110 μm and an expanded surface ratio of approximately 400 times (FIG.3 (*a*)). This aluminum etching foil was subjected to pressing from the top and bottom of the foil, thereby forming low-porosity arts (FIG. 3(*b*)).

Portions of the low-porosity parts formed as mentioned above to serve as one of side surfaces of capacitors were cut by a laser (FIG. 3(*c*)).

After cutting, the porous metallic base material was immersed in a 1.4 g/L aqueous solution of ammonium dihydrogen phosphate for 10 minutes at room temperature, thereafter, washed with pure water, then dried, and subjected to annealing treatment for 30 minutes at 300° C., thereby forming a phosphorus-containing layer (phosphoric acid treatment). Then, $AlO_x$ (x is 1.2 or more) of 30 nm was formed at 250° C. by an ALD method (FIG. 3(d)).

Next, the top and bottom of the low-porosity parts not subjected to cutting in the foregoing were subjected to masking (FIG. 3(e)), and polyaniline was applied as a conductive polymer to form an upper electrode (FIG. 3(f)).

Next, the low-porosity parts coated with the mask were cut (FIG. 3(g)).

Then, the mask was removed by heat treatment at high temperature (FIG. 3(h)).

Figures 3, 3I:
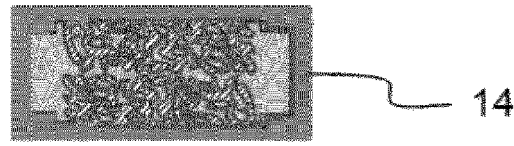
Figures 3, 3J:
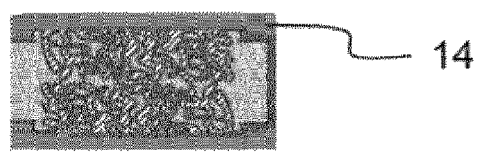
Figures 3, 3K:
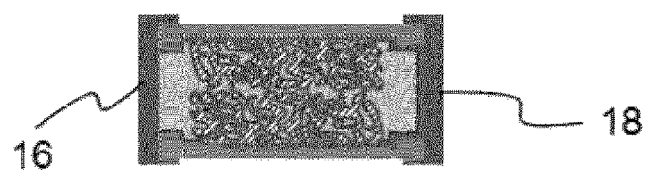

Next, a protective layer of $SiO_2$ was formed by a CVD method so as to cover the entire surface of the chip with a thickness of 2 μm on average (FIG. 3(i)). Then, the protective layer on both ends of the element was etched with a fluorine based gas (FIG. 3(j)), and Ni terminal electrodes of 5 μm in thickness were formed there by plating, and Sn of 3 μm was formed thereon by plating (FIG. 3(k)). In this way, the film structure as shown in FIG. 2(b), that is, the capacitor in a chip form (length (L)=approximately 1.6 mm, width (W)=approximately 0.8 mm, thickness (T)=approximately 0.15 mm) was prepared where the phosphorus-containing layer, the dielectric layer, and the upper electrode layer were sequentially formed on the porous metallic base material (aluminum etching foil).

Comparative Example 1

A capacitor according to Comparative Example 1 was prepared in the same way as in Example 1, except that the porous metallic base material was washed with water without being immersed in the aqueous solution of ammonium dihydrogen phosphate. More specifically, the capacitor according to Comparative Example 1 has no phosphorus-containing layer.

Test Example

End surfaces of the capacitors according to Example 1 and Comparative Example 1 were ground by focused ion beam (FIB: Focused Ion Beam) processing, thereby exposing cross sections. The cross sections were observed with a transmission electron microscope (TEM: transmission electron microscope; JEM-2200FS from JEOL Ltd.), thereby figuring out the thicknesses of the alumina layers as dielectric layers. As a result, the thicknesses were 32 nm in the capacitor according to Example 1, and 34 nm in the capacitor according to Comparative Example 1.

In addition, the cross sections were subjected to an energy dispersive X-ray analysis (through the use of an EDS (Energy Dispersive X-ray Spectroscopy) JED-2300T dry SD60GV detector from JEOL Ltd.) with a transmission electron microscope (JEM-2200FS from JEOL Ltd.), thereby analyzing the interfaces between the porous metallic base materials and the alumina layers. The observation conditions have an acceleration voltage of 200 kV, a beam diameter of 1.5 nm, and a current of 1 nA. As a result, in the capacitor according to Example 1, a layer with a high phosphorus (P) concentration was observed between the porous metallic base material and the alumina layer. When EDS line measurements were made at every 0.2 nm so as to perpendicularly cross the interface between the porous metallic base material and the dielectric, the P concentration reached a maximum value substantially at the interface, and the full width at half maximum was approximately 3 nm the on average. On the other hand, such a phosphorus-containing layer was not observed in the capacitor according to Comparative Example 1.

A time dependent dielectric breakdown (TDDB: Time Dependent Dielectric Breakdown) test was carried out. Specifically, for each of fifteen capacitor samples according to each of Example 1 and Comparative Example 1, a direct-current voltage was applied between the porous metallic base material and the upper electrode to reach 5.0 to 5.6 MV/cm in a test tank with a temperature set at 105° C., the current through the capacitor was monitored, and a failure was determined when the current through the capacitor reached 100 μA.

The obtained results were subjected to a Weibull analysis, thereby figuring out the time to failure till when the cumulative failure rate reached 99.9%. The results are shown in Table 1.

TABLE 1

| Sample | Electric Field Intensity (MV/cm) | Time to Failure till Cumulative Failure Rate of 99.9% (second) |
| --- | --- | --- |
| Example | 5.3 | $4.0 \times 10^1$ |
|  | 5.5 | $2.0 \times 10^2$ |
|  | 5.6 | $4.0 \times 10^2$ |
| Comparative Example | 5.0 | $4.7 \times 10^1$ |
|  | 5.2 | $9.3 \times 10^1$ |
|  | 5.3 | $2.6 \times 10^2$ |

Figure 4:
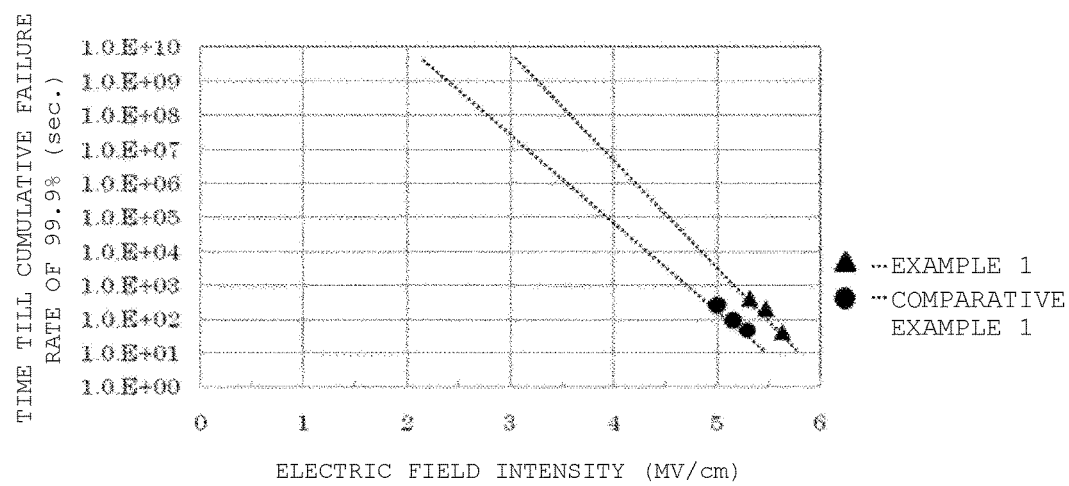
FIG. 4 is a diagram showing a test result in an example.

The results in Table 1 were plotted in graph where the horizontal axis is an "electric field intensity" and the vertical axis is a "logarithm of time to failure till the cumulative failure rate of 99.9%". The results are shown in Table 4. From FIG. 4, it has been confirmed that the capacitor according to Example 1, subjected to the phosphoric acid treatment by immersion in the aqueous solution of ammonium dihydrogen phosphate, has higher reliability than the capacitor according to Comparative Example 1, not subjected to phosphoric acid treatment. In addition, the time to failure is Example 1: approximately 33 years and Comparative Example 1: 0.1 years at an electric field intensity of approximately 3.3 MV/cm with an assumption that DC 10 V is applied when a linear regression expression is obtained from FIG. 4, and it has been thus confirmed that the long-term reliability is improved by applying the phosphoric acid treatment. This is believed to be because locating the phosphorus-containing layer has been succeeded in preventing the diffusion of impurities on the surface of the porous metallic surface into the dielectric layer.

The capacitor according to the present invention is, because of its remarkable stability and high reliability, used for various electronic devices in a preferred manner.

DESCRIPTION OF REFERENCE SYMBOLS

1: capacitor
2: high-porosity part
4: low-porosity part
6: porous metallic base material
7: phosphorus-containing layer
8: dielectric layer
10: upper electrode
12: wiring electrode
14: protective layer
16: first terminal electrode
18: second terminal electrode 20: cutting site
22: mask

The invention claimed is:

1. A capacitor comprising:
   a porous metallic base material that includes a high-porosity part in a central part thereof and a low-porosity part at a side face part thereof, wherein a first porosity of the high-porosity part is 30% to 80%, and a second porosity of the low-porosity part is 60% or less of the first porosity of the high-porosity part;
   a phosphorus-containing layer on the porous metallic base material;
   a dielectric layer on the phosphorus-containing layer; and
   an electrode on the dielectric layer.

2. The capacitor according to claim 1, wherein the porous metallic base material is selected from the group consisting of aluminum, tantalum, nickel, copper, titanium, niobium, iron, stainless steel and duralumin.

3. The capacitor according to claim 1, wherein the porous metallic base material comprises aluminum.

4. The capacitor according to claim 1, wherein the phosphorus-containing layer is 20 nm or less in thickness.

5. The capacitor according to claim 1, wherein the phosphorus-containing layer is 0.5 to 10 nm in thickness.

6. A method for manufacturing a capacitor, the method comprising:
   treating a surface of a porous metallic base material with a phosphoric acid-based solution to form a phosphorus-containing layer on the surface of the porous metallic base material, wherein the porous metallic base material includes a high-porosity part in a central part thereof and a low-porosity part at a side face part thereof, wherein a first porosity of the high-porosity part is 30% to 80%, and a second porosity of the low-porosity part is 60% or less of the first porosity of the high-porosity part;
   forming a dielectric layer on the phosphorus-containing layer; and
   forming an electrode on the dielectric layer.

7. The manufacturing method according to claim 6, wherein the phosphoric acid-based solution is an aqueous solution of a phosphoric acid and/or a phosphate.

8. The manufacturing method according to claim 6, wherein the phosphoric acid-based solution is an aqueous solution of ammonia phosphate.

9. The manufacturing method according to claim 6, wherein the phosphoric acid-based solution is an aqueous solution of ammonium dihydrogen phosphate.

10. The manufacturing method according to claim 6, wherein the phosphoric acid-based solution has a pH of 1 to 10.

11. The manufacturing method according to claim 6, wherein the phosphoric acid-based solution has a pH of 4 to 7.

12. The manufacturing method according to claim 6, wherein the dielectric layer is formed by a gas-phase method.

13. The manufacturing method according to claim 12, wherein the gas-phase method is an atomic layer deposition method.

14. The manufacturing method according to claim 6, further comprising, after the treating of the surface of the porous metallic base material, annealing the phosphorous-containing layer.

15. The manufacturing method according to claim 6, wherein the porous metallic base material is selected from the group consisting of aluminum, tantalum, nickel, copper, titanium, niobium, iron, stainless steel and duralumin.

16. The manufacturing method according to claim 6, wherein the porous metallic base material comprises aluminum.

17. The manufacturing method according to claim 6, wherein the treating of the surface of the porous metallic base material with the phosphoric acid-based solution is carried out such that the phosphorus-containing layer is 20 nm or less in thickness.

18. The manufacturing method according to claim 6, wherein the treating of the surface of the porous metallic base material with the phosphoric acid-based solution is carried out such that the phosphorus-containing layer is 0.5 to 10 nm in thickness.

* * * * *